United States Patent [19]

Ogawa et al.

[11] 4,441,133
[45] Apr. 3, 1984

[54] TAPE GUIDE OF MAGNETIC RECORDING AND REPRODUCING APPARATUS

[75] Inventors: Tsuneo Ogawa; Manabu Ikeda; Seii Miyakawa, all of Yokohama; Kazunori Iijima, Ibaraki; Takao Terayama, Kashiwa; Takeshi Matsui, Yokohama, all of Japan

[73] Assignee: Hitachi, Ltd., Tokyo, Japan

[21] Appl. No.: 282,806

[22] Filed: Jul. 13, 1981

[30] Foreign Application Priority Data

Jul. 11, 1980 [JP] Japan .............................. 55/96935[U]

[51] Int. Cl.³ ........................ G11B 15/60; B65H 23/04
[52] U.S. Cl. ................................. 360/130.22; 226/196
[58] Field of Search ...................... 360/130.22–130.24; 226/196

[56] References Cited

U.S. PATENT DOCUMENTS 2,862,715 12/1958 MacDonald ...................... 226/196
3,376,395 4/1968 Rumple ........................... 360/130.23
4,274,118 6/1981 Mangold ......................... 360/130.24

Primary Examiner—Robert S. Tupper
Attorney, Agent, or Firm—Antonelli, Terry & Wands

[57] ABSTRACT

A guide roller of a tape traveling system of a video tape recorder and the like for changing the direction of travel of a magnetic tape and regulating the heightwise position of the tape during its travel including a roller body of a diameter not constant but smoothly varying axially thereof for exerting on the traveling tape a force tending to shift the tape axially. The guide roller has a flange at the top and the bottom of the roller body having a tape guide surface for contacting the edge of the tape which is not perpendicular to the axis of the roller body but convex as viewed from the respective end of the roller body, to prevent the edge of the tape from striking the edges of the flanges. The roller body may be conical at its outer peripheral surface and at the tape guide surface of each flange.

13 Claims, 7 Drawing Figures

TAPE GUIDE OF MAGNETIC RECORDING AND REPRODUCING APPARATUS

BACKGROUND OF THE INVENTION

This invention relates to a magnetic tape traveling system of a magnetic recording and reproducing apparatus, and, more particularly, to a guide roller having a shape and configuration for enabling adjustments of the tape traveling system to be effected in a simplified manner at the time of assembly.

In a video tape recorder for household use, for example, the present practice requires bringing of a magnetic tape obliquely into contact with a tape guide of the cylindrical shape having a rotary head. Guide pins and guide rollers are used in this type of magnetic tape traveling system. In the prior art, as shown in FIG. 1 a guide roller 9 comprises a shaft 1, a roller 2 and flanges 3 and 4 located at the top and the bottom of the roller 2, respectively. The guide roller 9 is as shown in FIGS. 2a, 2b, used, for example, in a cassette type video tape recorder for guiding, in cooperation with a tilting pin 10 (10'), a magnetic tape 8 to bring same into contact with a cylinder 11 having a rotary head with a predetermined tilt for a predetermined circumferential extent. More specifically, the tilting guide pins 10 and 10' twist the magnetic tape 8 to bring same into contact with the cylinder 11 which is tilted with respect to a chassis surface 31, to cause the tape 8 to move spirally along the peripheral surface of the cylinder 11. The guide rollers 9 and 9' have the function of changing the direction of travel of the magnetic tape 8.

In FIG. 2a, the numeral 5 designates a two-reel tape cassette in which two reels 6 and 6' are located in the same plane, with guide pins 7 and 7' being attached to the tape cassette 5. The numeral 12 designates a fixed head for recording and reproducing a sound signal and control signal. A capstan 13 and a pinch roller 15 are concerned in the travel of the magnetic tape 8 in a recording mode or a playback mode.

The roller 2 of the guide rollers 9 and 9' of the prior art of the tape traveling system has the function of changing the path of travel of the magnetic tape 8. Since the inner peripheral surface and the outer peripheral surface of the roller 2 are coaxial cylindrical surfaces, the roller 2 itself is unable to exert a force on the tape 8 in a direction parallel to the longitudinal axis of the roller 2. Thus, the flanges 3 and 4 have the function of regulating the movement of the tape 8 along the axial length thereof. The flanges 3 and 4 are spaced apart from each other a distance which is slightly greater than the width of the tape 8, to avoid damage to the tape 8. Thus in order to regulate the position of the tape 8 along the axial length of the roller 2 and the pressing of the tape 8 against the upper flange 3 or the lower flange 4, it has been common practice to push up or down the tape 8 by slightly tilting the shaft 1 of the roller 2 in such a manner that no curling of the tape occurs near the inlet and outlet of the flanges 3 and 4 or the edges of the tape 8 do not strike hard the edges of the flanges 3, 4.

The operation of adjusting the relative positions of the guide roller 9 and the magnetic tape 8 is troublesome and time consuming because the angle at which the shaft 1 is tilted is very small or in the range between 20° and 40°. Moreover, when the direction of travel of the tape 8 is reversed for switching the recorder to a playback mode, the force exerted on the tape 8 by the roller 2 has its direction reversed, with a result that the position of the tape 8 with respect to the axial length of the roller 2 undergoes changes and a reproduced picture of high quality is unobtainable.

In addition, tilting of the shaft 1 would cause the edges of the tape 8 to readily strike the edges of the flanges 3 and 4, so that the tape 8 would tend to curl in the vicinity of the guide rollers 9, 9'.

SUMMARY OF THE INVENTION

Accordingly this invention has as its object the provision of a guide roller of a magnetic recording and reproducing apparatus capable of stabilizing the travel of a magnetic tape by applying a force at all times in a predetermined width direction of the tape regardless of the direction of its travel while minimizing the risk of the development of curls.

The aforesaid object is accomplished by providing, in the outer periphery of the roller, a curved surface in which the diameter varies smoothly with respect to the axis of the roller, such as a conical surface. Also, the flanges at the top and the bottom of the roller each have a tape guide surface which is tapered, for example, with respect to the roller axis without being disposed perpendicular thereto, so that the surface between the two flanges is in the form of a curved surface extending from the center axis toward the outer periphery which diverges in going from one flange toward the other flange.

In the present invention, the roller has a diameter which varies axially of the roller, so that the peripheral velocity of the roller varies from one point to another along an axial length thereof. Thus, a force is exerted on the tape tending to shift it toward a larger diameter portion. The direction in which this force is oriented remains unaltered when the direction of travel of the tape is reversed, so that it is possible to generate a force which moves the tape in a predetermined direction widthwise thereof. Thus, the edge of the tape can be forced against the tape guide surface of the upper flange or the lower flanges of the roller, to keep the height position of the tape constant. Also, the feature that the tape guide surface of each flange is not perpendicular to the axis of the roller and the surface between the two flanges extending from the center axis toward the outer periphery is curved and diverges in going from one flange toward the other flange is conducive to prevention of the development of curls because the tape is prevented from striking the edge of each flange at the tape inlet and outlet portions of the flanges even if the guide roller is axially tiled when installed.

When the guide roller having these features is used as a guide roller arranged close to a cylindrical tape guide having a rotary head, the stability with which the tape is brought into contact with the cylindrical tape guide can be increased. The variation in the diameter of the guide roller is preferably not too large. If it is inordinately large, unnecessarily large forces would be exerted on the tape and damage to the tape would be caused. Thus, when the surface is conical, for example, the vertical angle formed by extensions of the two ridges of the roller is preferably about 0.75 to 1°.

BRIEF DESCRIPTION OF THE DRAWINGS

FIG. 2b is a front view of the cylinder portion shown in FIG. 2a;

DESCRIPTION OF THE PREFERRED EMBODIMENT

Figure 3:
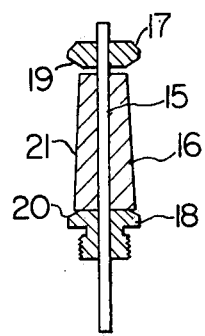
FIG. 3 is a sectional view of the guide roller comprising one embodiment of the invention.

Referring now to the drawings wherein like reference numerals are used throughout the various views to designate like parts and, more particularly, to FIG. 3, according to this figure, a guide roller comprises a shaft 15, an upper flange 17, a lower flange 18, a conical roller 16 having an outer peripheral surface 21, a tape guide surface 19 of the upper flange 17, a tape guide surface 20 of the lower flange 18. The vertical angle $\theta$ (FIG. 6) of the axial cross section of the conical roller 16 is in the range between 0.75 and 1°.

Figure 4:
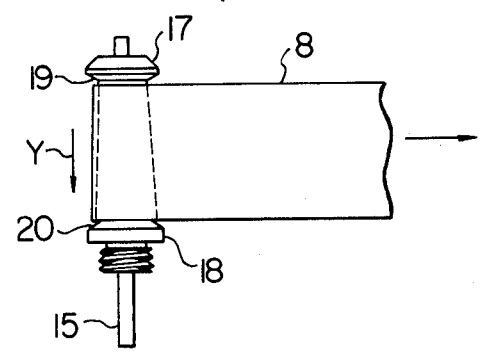
FIG. 4 is a side view showing the manner in which the tape contacts the guide roller shown in FIG. 3 during its travel.

When a tape 8 contacts the conical roller 16 diverging in going from the upper end toward the lower end for a certain circumferential extent during its travel, the conical roller 16 is rotated about the shaft 15 by frictional drag applied by the tape 8, as the tape 8 travels in the direction shown in FIG. 4. As a result, the tape 8 shifts toward the lower end (maximum diameter end) of the conical roller 16 as indicated by an arrow Y in FIG. 4, into engagement with the tape guide surface 20 of the lower flange 18. The phenomenon that the tape 8 shifts toward the maximum diameter end of the conical roller 16 has nothing to do with the direction of travel of the tape 8, so that it is possible to obtain stability of travel of the tape 8 by bringing the tape 8 into contact with the tape guide surface 20 of the lower flange 18 at all times.

Figure 1:
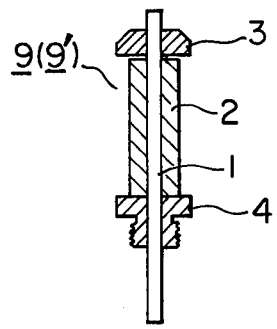
FIG. 1 is a sectional view of a guide roller of the prior art used with a magnetic recording and reproducing apparatus.
Figure 2A:
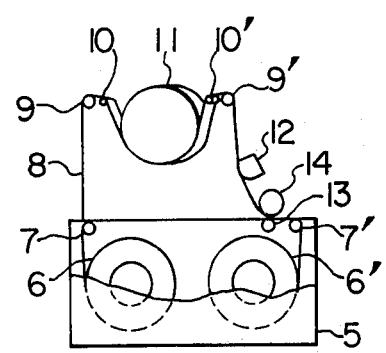
FIG. 2a is a schematic plan view of the tape traveling system of a video tape recorder in which the invention has particular utility.
Figure 2B:
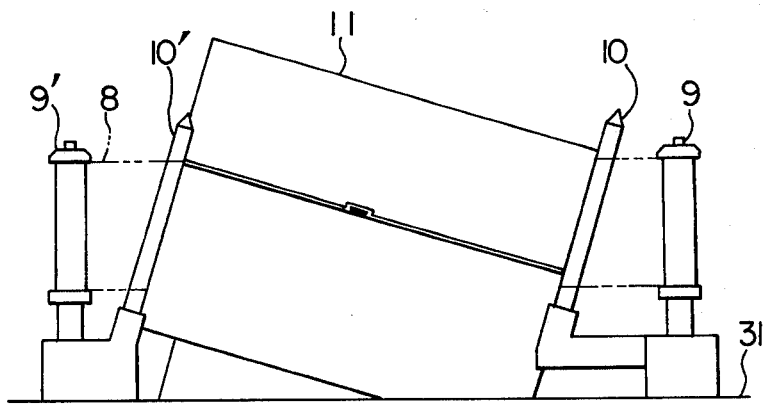

When the guide roller shown in FIGS. 3 and 4 is used as guide rollers 9 and 9' shown in FIGS. 2a and 2b, the magnetic tape 8 can be maintained in a position which is constant with respect to the cylinder 11 during its travel, to enable recording and playback to be effected stably at all times.

The optimum value of the vertical angle $\theta$ of the conical roller 16 may vary depending on the diameter of the roller, diameter of the cylinder 11, etc. Preferably, the optimum value is obtained by checking the stability of the reproduction output by reproducing the recordings in standard tapes.

It is to be understood that the invention is not limited to the conically tapering outer peripheral surface of the roller and that any other curved surface in which the diameter of the roller smoothly varies in going downwardly from above or upwardly from below may be used.

Figure 5:
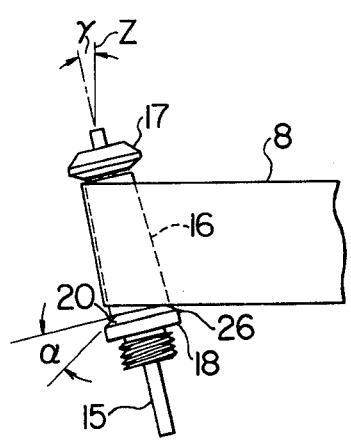
FIG. 5 is a side view showing the manner in which the tape contacts the guide roller according to the invention instaled with its center axis tilting during its travel.

The operation of the guide roller in which the tape guide surfaces 19 and 20 of the upper and lower flanges 17 and 18, respectively, are not perpendicular to the shaft 15 will be described. When the outer peripheral surface of the roller 16 is shaped such that the diameter smoothly varies in going from one end toward the other end, the tape 8 brought into contact with the outer peripheral surface 21 of the roller 16 during its travel shifts toward the end of the roller 16 at which the diameter is maximized. This eliminates the need to tilt the shaft of the roller as is done in the prior art. However, as shown in FIG. 5, the roller 16 may have its shaft 15 tilted. Also, tilting will occur to a certain degree by errors in assembly. When the center axis of the guide roller 16 tilts through an angle $\gamma$ with respect to the vertical Z, for example, the edge of the tape 8 is prevented from striking an edge portion 26 of the flange 18 if the tape guide surface 20 of the lower flange 18 has a tapering angle $\alpha$ which is greater than the angle $\gamma$, thereby avoiding curling of the tape 8. Thus, the height position of the tape 8 thereof can be regulated to enable the edge of the tape 8 to be positioned against the tape guide surface 20 without causing the tape 8 to curl.

Figure 6:
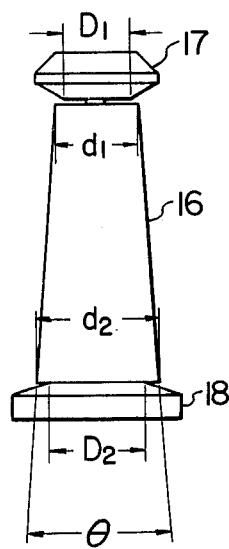
FIG. 6 is a side view showing one example of the shape of the roller and the flanges of the guide roller according to the invention.

The tape guide surfaces 19 and 20 of the upper flange 17 and lower flange 18, respectively, shown in FIGS. 3-5 are tapered surfaces. However, the tape guide surfaces may be of any other curved shape, such as spherical surfaces. Preferably portions of the tape guide surfaces 19 and 20 contacting the roller 16 have as shown in FIG. 6, diameters $D_1$ and $D_2$, respectively, which are equal to, or smaller than, the corresponding diameters $d_1$ and $d_2$ of the roller 16 to thereby avoid curling of the tape 8.

From the foregoing description, it will be appreciated that the guide roller 16 incorporating therein the features of the invention can minimize the risk of curling of the tape 8 in the inlet and outlet portions of the flanges 17, 18. Moreover, the guide roller 16 according to the invention enables the tape 18 to travel while contacting one of the flanges 17 or 18 of the roller 16 at all times regardless of the direction of travel of the tape 8 and a slight tilting of the shaft 15 of the guide roller 16, thereby facilitating adjustments of the tape travel system.

What is claimed is:

1. A guide roller suitable for use in a tape traveling system of a magnetic recording and reproducing apparatus, the guide roller comprising:
  a roller body means for guiding a tape during a travel thereof through a magnetic recording and reproducing apparatus, said roller body means having a diameter smoothly increasing axially from a first end to a second end of the roller body means;
  at least one flange means disposed at the end of said roller body means having a greater diameter for regulating a position of the tape on the roller body means; and
  a tape guide surface means on said flanges means which is tapered with respect to a longitudinal center axis of the roller body means for engaging an edge of the tape.

2. A guide roller as claimed in claim 1, wherein at least two flange means are provided and are respectively located at the first and second ends of said roller body means, each of said flange means including a tape guide surface means which is tapered with respect to the longitudinal center axis of the roller body means.

3. A guide roller as claimed in claim 1, wherein said roller body means has an outer peripheral surface which is conical in shape.

4. A guide roller as claimed in one of claims 1 or 2, wherein the tape guide surface of said at least one flange means is convex in shape, as viewed from the end of the roller body means.

5. A guide roller as claimed in claim 1, wherein said roller body means has an outer peripheral surface which is conical in shape and has a vertical angle in the range between 0.75 and 1°.

6. A guide roller as claimed in one of claims 1 or 2, wherein said at least one flange means has at a portion thereof in contact with the roller body means a diameter equal to or less than the diameter of the roller body means.

7. In a tape traveling system comprising a tape inlet means, a tape outlet means, a cylindrical tape guide means disposed between said tape inlet means and said tape outlet means and including a rotary head, tilting guide pin means respectively disposed at the tape inlet means and tape outlet means for bringing a magnetic tape obliquely into contact with the cylindrical tape guide means during a travel of the tape through the system, and guide roller means respectively located at the tape inlet means and tape outlet means for regulating a height position of the tape, each of said guide roller means comprising:
 a roller body means having a diameter smoothly increasing in a direction of a longitudinal axis thereof from a first end to a second end of said roller body means, said roller body means being mounted for rotation as the magnetic tape travels while in contact therewith; and
 at least one flange means located at the end of said roller body means having a greater diameter for regulating a position of the magnetic tape on the roller body means, said flange means including tape guide surface means for engaging an edge of the magnetic tape, said tape guide surface means being tapered with respect to the longitudinal axis of the roller body means.

8. A tape traveling system as claimed in claim 7, wherein said roller body means of each of said guide roller means has an outer peripheral surface which is conical in shape.

9. A tape traveling system as claimed in claim 8, wherein said conical shaped outer peripheral surface of said roller body means has a vertical angle between 0.75° and 1°.

10. A tape traveling system as claimed in claim 7, wherein said at least one flange means of each of said guide roller means has a diameter which is equal to or less than the diameter of the roller body means.

11. A tape traveling system as claimed in claim 7, wherein each of said guide roller means includes two flange means respectively disposed at the first and second ends of said roller body means, and wherein each of the flange means is tapered with respect to the longitudinal center axis of the roller body means.

12. A tape traveling system as claimed in claim 11, wherein portions of each of said flange means contacting the roller body means have a diameter equal to or less than the diameter of the roller body means.

13. A tape traveling system as claimed in claim 7, wherein each of said roller body means has a tapered outer peripheral surface.

* * * * *